April 19, 1938. T. S. GORTON, JR 2,114,530
METHOD OF PACKING BLOCKS OF COMESTIBLES FOR FREEZING AND PRODUCT THEREOF
Filed Jan. 4, 1938 2 Sheets-Sheet 1
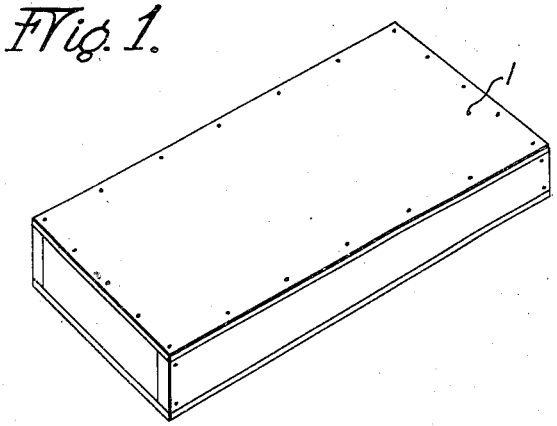
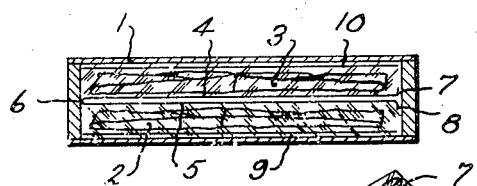
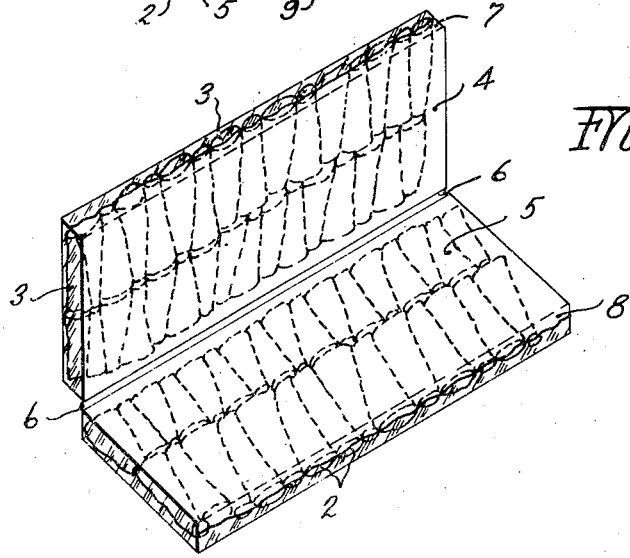
INVENTOR
Thomas Slade Gorton, Jr.
BY
Chapin + Neal
ATTORNEYS April 19, 1938.   T. S. GORTON, JR   2,114,530
METHOD OF PACKING BLOCKS OF COMESTIBLES FOR FREEZING AND PRODUCT THEREOF
Filed Jan. 4, 1938   2 Sheets-Sheet 2

INVENTOR
THOMAS SLADE GORTON, JR.
BY
Chapin & Neal
ATTORNEYS

Patented Apr. 19, 1938

2,114,530

UNITED STATES PATENT OFFICE 2,114,530

METHOD OF PACKING BLOCKS OF COMESTIBLES FOR FREEZING AND PRODUCT THEREOF

Thomas Slade Gorton, Jr., Evanston, Ill.

Application January 4, 1938, Serial No. 183,274

12 Claims. (Cl. 99—174)

This invention relates to a method of layer or sectional packing of comestibles such as freshly cut fillets of fish, whole dressed fish, meat, etc., preparatory to the block freezing of the same, together with the improved product or article of manufacture obtained by said method. This application is filed as a continuation in part of the application filed by me August 26, 1937, Serial No. 161,092.

Heretofore it has been the practice in preparing such foodstuffs as fillets of fish for freezing and cold storage to pack the same in containers in superposed horizontal layers so as to form a block, which before freezing is held in shape by the confining walls of the container. Fish fillets, particularly when freshly cut, are flaccid and extremely moist and lend themselves to being very closely packed together by hand in a mold formed block which when frozen will have much the same solid character as a block of ice. In such a frozen block, even though the fillets making up the same have been packed in layers, the block as a whole will have no predictable lines of cleavage for being easily separated into definite parts until thawed out.

For commercial distribution it has been customary in packing and freezing such blocks of fillets to weigh the total amount of fillets making up the block so as to provide a predetermined unit weight of fish in each frozen block. The aforesaid frozen blocks of fillets are shipped in separate containers marking the known weight of each block to wholesalers and distributers and in the usual course of commercial distribution are kept in frozen condition, and are only thawed out for sale of small weights or individual fillets when reaching the retailer or consumer's market. It frequently becomes desirable, however, in the distribution and sale of said unit blocks of frozen fillets between wholesalers and middlemen to subdivide the blocks into smaller weight units than as originally frozen. For example, a block as originally frozen may contain ten pounds of fish fillets and an occasion may arise where the middleman may desire to purchase half a block or two and a half blocks of said unit weights. It then becomes necessary to sub-divide the block in half and with the usual blocks this can be accomplished only roughly since the frozen blocks are not readily sub-divided in even units until thawed out.

It is the object of the present invention to prepare fish fillets and similar moist units of comestibles in a manner to facilitate the commercial distribution and sale of the same and to make it convenient and easy for the larger wholesaler to deliver to the smaller dealers blocks of frozen fish in whole weight units or in definite sub-divided parts thereof. To this end I pack the freshly cut and moist fish fillets closely together in superposed layers or sections in a block forming container. If the fillets are small two or more layers may be combined to form a sub-unit or slab of the block to be frozen, each slab having a known weight and constituting a predetermined fraction of the weight of the block. Sometimes the fillets or pieces of comestible may be large enough so that a single layer or even a single piece will form the desired slab of known weight and fractional part of the block. I introduce between the said slabs as they are packed, a means for furnishing a plane of easy and definite cleavage between said stratified slabs when frozen together in the block. In this way a frozen block of say ten pounds may be made up of two slabs each containing five pounds of fillets, and while said slabs will be frozen together firmly into a self-sustaining block, they may nevertheless be readily separated into two units, each of five pounds' weight, along said plane of cleavage.

While in the foregoing I have mentioned a definite plane of cleavage between the stratified layers of the block, it should be understood that this plane is not necessarily a flat or even a smooth plane but will usually have a very irregular contour due to the flaccid character and irregular shapes of the fillets and to the fact that they are very closely packed together throughout the block.

The means for accomplishing the aforesaid object will be more particularly described in connection with the accompanying drawings which show a preferred manner in which my invention will be carried out and in which, Fig. 1 is a perspective view of a box or container filled with a block of frozen fish fillets, ready for commercial distribution;

Fig. 2 is a transverse section of the same showing the manner of packing the fillets and the means for obtaining a plane of cleavage between separate slabs or layers of the block;

Fig. 3 is a perspective view showing a frozen block of fish fillets with the slabs or layers thereof being separated along the plane of cleavage;

Figure 4:
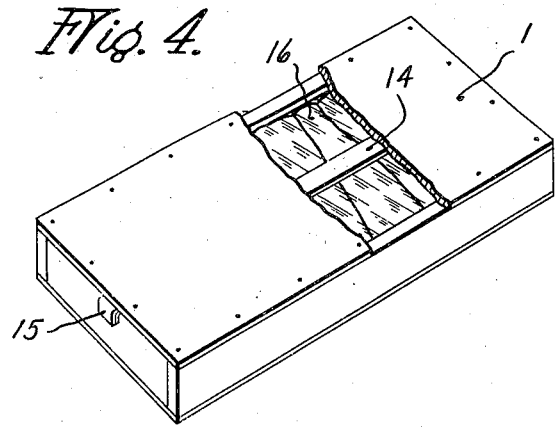
Fig. 4 is a view in perspective of a box containing a frozen block of fillets packed in a slightly modified manner, a portion of the box top being broken away.

Referring more particularly to the drawings, 1 is the outside container holding a frozen block of fish fillets. This container may be of wood or rigid synthetic material of any character suitable for containing the comestible, and shows the usual shape of the block or mold form into which the fillets are packed and placed in the freezer. It is customary to pack, freeze, and ship the block to market in the same container, although in some cases the block may be packed and frozen in a pan or separate mold and then transferred to a container or paper wrapper for shipment. In any event the block of comestible within the container shipped to market is usually kept frozen solid during the course of market distribution and until it reaches the retailer or consumer market.

2 and 3 indicate superposed layers of freshly cut fish fillets, the fillets of each layer being closely packed together and the layers being built up successively with the fillets of each succeeding layer closely packed against the fillets of the previously arranged layer. For simplicity of illustration I have shown a single layer as constituting the stratified slab or sub-unit of the block. 4 and 5 indicate the separate plies of a double sheet of a moisture proof pellicle such as thin, tough and pliable paper, preferably waxed parchment or cellophane which is smoothed and pressed down upon the first layer of fillets 2 preparatory to forming the second layer 3 thereon. The double sheet pellicle 4, 5 is substantially coextensive in area with or slightly larger than the layers 2 and 3 between which it is interposed and is preferably formed with extended edges or tabs 7 and 8 projecting from one edge wall of the block for a purpose to be described. In introducing the double sheet pellicle 4, 5 between the layers it is important to keep the confronting surfaces between the sheets free of moisture and substantially dry. The double sheet may consist of two separate sheets, or as shown, a long sheet folded double, the fold thereof being indicated at 6.

The packing of the fillets within the mold form or box 1 preparatory to freezing may be performed by hand and each fillet should be closely pressed against its neighbor to eliminate voids and to arrange the same in horizontal layers of approximately equal dimensions. If greater compactness and a saving of space are desired pressure packing by machine may be resorted to. In other words, the block when formed may be subjected to heavy pressure to compress the fillets into more intimate contact, which pressure of course should be retained thereon until the block is frozen. The interposed cleavage sheet 4, 5 due to its pliable character will withstand such heavy pressure without injury for it readily conforms to such irregularity in contour as will occur in the plane of cleavage between the packed layers. A suitable way for thus packing the fillets under pressure for subsequent freezing in this condition is to pack in a container with pressure resisting walls and use a ram or pressure plunger for forcing a plug-like cover down upon the packed contents of the container to give the desired pressure thereto. After the requisite pressure is obtained the pressed down plug cover can be fastened to the container so as to retain the pressure in the block during subsequent freezing.

Preferably before being packed in a layer, a definite amount of fillets are weighed up, say five pounds, for the making of each layer or slab. In some cases the five pound slab which may be termed the stratum slab of the ten pound block may be formed of two sub-layers, and in building up such a five pound slab a single sheet of paper may be laid between said sub-layers as they are formed. Such a single sheet between sub-layers of a slab will not, however, form a definite plane of cleavage along which said sub-layers can be separated when frozen. The single sheet becomes thoroughly wet on both sides from contact with the extremely moist fillets and will firmly adhere to the contacting fillets at both sides thereof when frozen. In substantial effect, two such sub-layers are as firmly frozen together with a single sheet of paper between them as if the intervening paper were not present. Such a single sheet between the sub-layers of a slab serves the purpose of preventing the sub-layers sticking together after being thawed out as might occur in some fillets where the skin sides of one sub-layer come in contact with the faces of a superposed sub-layer.

Therefore in building up a block of unwrapped fillets to be frozen, a single sheet of paper may be used between sub-layers for the above purpose and to facilitate the formation of the even layers and a double sheet with the in between surfaces thereof dry should be used between such stratum slabs as are desired for easy cleavage from the frozen block.

In the drawings 9, 10 indicate respectively a single sheet of paper used as a liner for the block at top and bottom of the container. Single sheets of this character may be used between sub-layers of a stratum slab when such are made up. The purpose of providing the extended tabs or edges 7, 8 of the double sheet is so that when a frozen block is removed from its container for being split into half units, the two edges of the double sheet can readily be found and serve as a guide to insert a prying element, such as screw driver or any sharp pointed tool into the almost invisible crack between the two sheets 4 and 5. A slight prying pressure with such a tool at the edge of this crack will be sufficient to split the frozen block along the definite line of cleavage between the double sheet 4 and 5. The two frozen half blocks may then be easily separated by tearing the folded sheet 4, 5 along its folded edge 6.

It is of course obvious that the sheets 4, 5, 9 and 10 should be of such material as will not injuriously affect the comestible with which they contact. The double sheet 4, 5 particularly should have sufficient strength and toughness to withstand freezing without disintegration and should not absorb moisture but on the contrary be water resistant. Moistureproof waxed parchment paper or moistureproof cellophane of usual light wrapper weight has been found satisfactory for the cleavage sheets 4 and 5.

Figure 5:
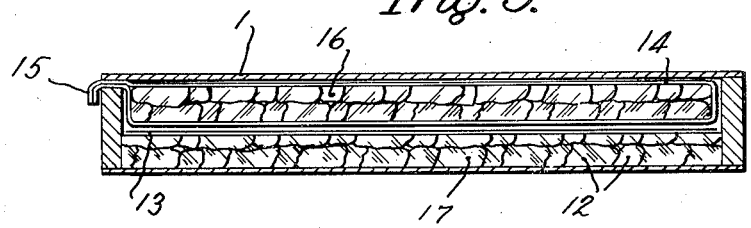
Fig. 5 is a sectional view of said modified form of packing.
Figure 6:
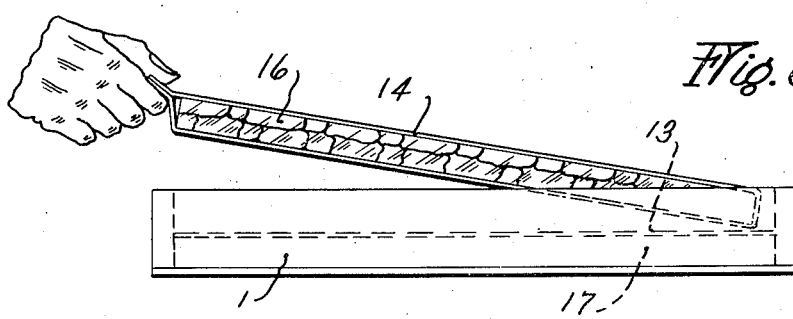
Fig. 6 is a side view showing the manner of separating the parts of the block in Figs. 4 and 5.
Figure 7:
Fig. 7 is a detail of an individually wrapped fillet.

A modified manner of carrying out my invention is shown in Figs. 4, 5 and 6. In this modification each individual fillet 11, as shown in Fig. 7, is separately enclosed in its own wrapper 12 which may be of cellophane or thin paper closely conforming to the fillet and allowing said fillets to be compacted into a block in substantially as close relation as previously described. These individual wrappers for the fillets, however during packing become wetted or moistened on the outside as an almost inevitable consequence of handling the same in said wrapping and packing operation. The individually wrapped fillets will therefore freeze together in an integral block in much the same manner as if not individually wrapped.

Such a frozen block may be made separable into pre-weighed aggregate parts or sections along a predetermined line of cleavage either by the interposition of a double sheet as heretofore described, or by the means shown in Figs. 4 and 5 wherein a single sheet 13 of thin flexible waterproof paper—parchment or cellophane—is laid between the parts, said sheet being substantially coextensive in area with or slightly larger than the abutting surfaces of said parts and combined with a superimposed splitting strip 14. This strip 14 extends across the sheet 13 preferably lengthwise and may be a tape or string or a narrow width of strong paper of sufficient toughness to serve in pulling apart along a line of cleavage, the aggregate parts of the integral frozen block. Preferably the splitting strip 14 is extended entirely around one of the aggregate parts of the block and the ends thereof are brought together outside of the block as indicated at 15. In this way when it is desired to split a frozen block, the two ends of the strip 14 may be grasped and pulled so as to lift one part 16 of the block away from the other part 17 of the block as shown in Fig. 6. It will be understood that the two parts 16 and 17 of the block have been weighed before packing so that the block is thus separable into parts of predetermined weight as may be desired in the commercial sale and distribution of such merchandise.

While in Figs. 4 and 5, I have shown a single sheet 13 combined with a splitting strip 14, it should be understood that if desired the double sheet with intervening substantially dry surfaces may also be used in combination with the splitting strip 14. In this case the splitting strip may be laid in between the double sheet or on top of the uppermost sheet and will act in separating the frozen parts in substantially the same manner as illustrated in Fig. 6.

In the drawings, an exaggerated space is shown between the confronting faces of the double sheet 4, 5, between the single sheet 13 and the splitting strip 14, and between the single sheets 9 and 10 and the walls of the container, and it will be understood that this is for purposes of illustration only since it is difficult to show by a drawing such elements frozen in situ as they would appear in the actual finished block.

While I have illustrated the aggregate groups of units as being stratified in horizontal layers, it is to be understood that they may also be stratified in vertical layers, and made easily separable when frozen into a solid block in the same manner as hereinbefore described.

I claim:

1. The method of packing units of comestibles in multiple layers for block freezing which consists in forming successively within a block molding receptacle horizontal and superposed layers of closely packed units, introducing between successive layers as formed a double sheet of a moisture resistant pellicle of pliable character adapted to conform closely to the contour of said interfitting layer surfaces substantially conterminous therewith, keeping the confronting surfaces between said sheets substantially free of moisture during packing and finally freezing said stratifying layers in one solid compacted block all for the purpose described.

2. The method of packing units of comestibles in multiple layers for block freezing which consists in forming successively within a block molding receptacle horizontal and superposed layers of closely packed units, introducing between successive layers as formed a double sheet of a moisture resistant pellicle adapted to conform closely to the contour of said interfitting layer surfaces and substantially coextensive in area therewith, keeping the inner confronting surfaces of said double sheet substantially free of moisture during the packing, applying pressure to said formed block to compact the same firmly together, and finally freezing said stratifying layers in one solid compacted block while under pressure all for the purpose described.

3. The method of packing units of comestibles in multiple layers for block freezing which consists in individually wrapping units of comestibles, packing said wrapped units in separate sections within a block molding receptacle, introducing between said sections as formed, a sheet of a moisture resistant pellicle of pliable material and a superposed strip of tough pliable material to serve as a splitting member, and finally freezing said sections and interposed sheet and strip in one solid compacted block all for the purpose described.

4. An article of manufacture comprising a frozen block of closely compacted units of comestibles, stratified in layers and adapted for relatively easy cleavage between said layers by the presence between said layers of a double sheet of moisture resistant pellicle, the confronting faces of said double sheet having been frozen together in a substantially dry state and having a relatively weak bond at freezing temperatures.

5. An article of manufacture comprising a frozen block of closely compacted units of comestibles, divisible into sections and adapted for relatively easy cleavage between said sections by the presence between said sections of a double sheet of moisture resistant pellicle, the confronting faces of said double sheet having been frozen together in a substantially dry state and having a relatively weak bond at freezing temperatures.

6. An article of manufacture comprising a frozen block of closely compacted units of comestibles, stratified in layers and adapted for relatively easy cleavage between said layers by the presence between said layers of a double sheet of a moisture resistant pellicle, the confronting faces of said double sheet having been frozen together in a substantially dry state and having a relatively weak bond at freezing temperatures, said double sheet having the double edges thereof projecting slightly beyond one side wall of said frozen block.

7. An article of manufacture comprising a frozen block of closely compacted units of comestibles, the integral form of said frozen block being an aggregate of parts each of predetermined weight and consisting of a plurality of units, said block while frozen being separable into its parts along predetermined lines of cleavage by having frozen in situ between said parts a double sheet of moisture resistant pellicle of pliable material with the intervening surfaces between said sheets in substantially dry condition.

8. An article of manufacture comprising a frozen block of closely compacted units of comestibles, each unit being individually enclosed in a flexible conforming wrapper, the integral form of said frozen block being an aggregate of parts each of predetermined weight and consisting of a plurality of units, said block while frozen being separable into its parts along predetermined lines of cleavage by having frozen in situ between said parts a double sheet of moisture resistant pellicle of pliable material with the intervening surfaces between said sheets in substantially dry condition.

9. An article of manufacture comprising a frozen block of closely compacted units of comestibles, each unit being individually enclosed in a flexible conforming wrapper, the integral form of said frozen block being an aggregate of parts each of predetermined weight and consisting of a plurality of units, said block while frozen being separable into its parts along predetermined lines of cleavage by having frozen in situ between said parts a sheet of moisture resistant pellicle of pliable material combined with a superposed splitting strip of tough flexible material.

10. An article of manufacture comprising a frozen block of closely compacted units of comestibles, each unit being individually enclosed in a flexible conforming wrapper, the integral form of said frozen block being an aggregate of parts each of predetermined weight and consisting of a plurality of units, said block while frozen being separable into its parts along predetermined lines of cleavage by having frozen in situ between said parts a sheet of moisture resistant pellicle of pliable material combined with a superposed splitting strip of tough flexible material, one or both ends of said splitting strip extending beyond the outside of said frozen block.

11. An article of manufacture comprising a frozen block of closely compacted units of comestibles, each unit being individually enclosed in a flexible conforming wrapper, the integral form of said frozen block being an aggregate of parts each of predetermined weight and consisting of a plurality of units, said block while frozen being separable into its parts along predetermined lines of cleavage by having frozen in situ between said parts a sheet of moisture resistant pellicle of pliable material combined with a superposed splitting strip of tough flexible material, said splitting strip being extended entirely around one of said parts and having both of its ends brought together outside of said frozen block.

12. An article of manufacture comprising a frozen block of closely compacted units of comestibles, each unit being individually enclosed in a flexible conforming wrapper, the integral form of said frozen block being an aggregate of parts each of predetermined weight and consisting of a plurality of units, said block while frozen being separable into its parts along predetermined lines of cleavage by having frozen in situ between said parts a sheet of moisture resistant pellicle of pliable material coextensive in area with the abutting surfaces of said parts combined with a superposed splitting strip of narrower width than said sheet and of a length to have at least one end extended outside of said frozen block.

THOMAS SLADE GORTON, JR.